No. 672,823. Patented Apr. 23, 1901.
J. M. DODGE.
STAIR LIFT.
(Application filed Jan. 7, 1901.)
(No Model.)
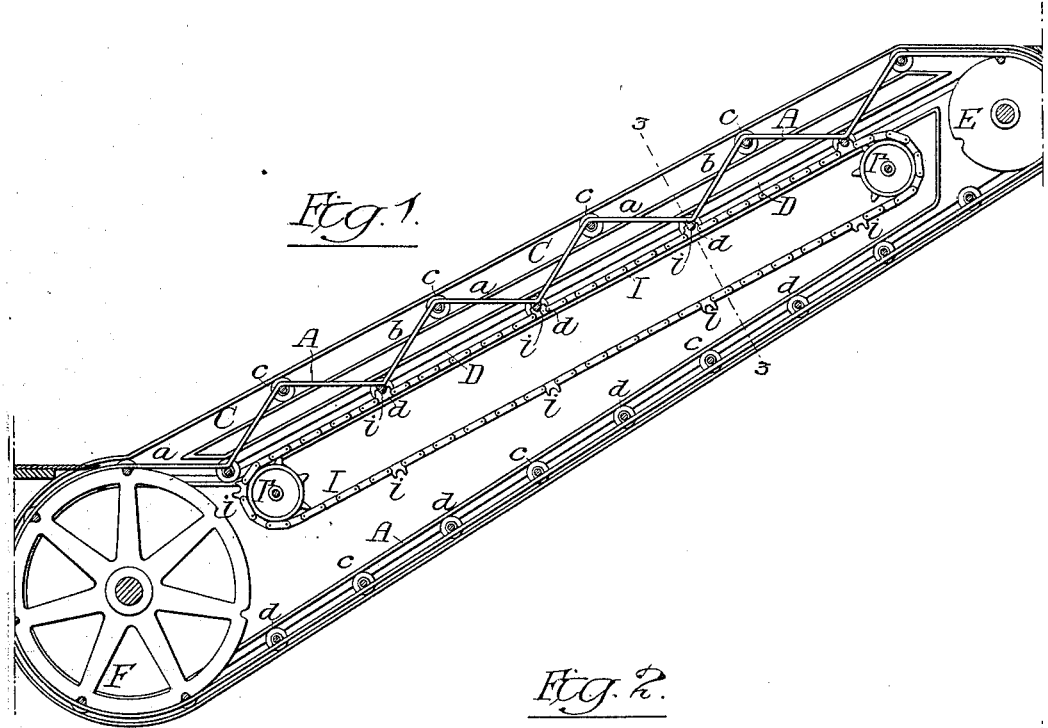
Witnesses:
Frank L. A. Graham
Louis W. Whitehead
Inventor:
James M. Dodge.
— by —
his Attorneys.
THE NORRIS PETERS CO., PHOTO-LITHO., WASHINGTON, D. C.

UNITED STATES PATENT OFFICE.

JAMES M. DODGE, OF PHILADELPHIA, PENNSYLVANIA, ASSIGNOR TO THE STAIR LIFT COMPANY, OF SAME PLACE AND CAMDEN, NEW JERSEY.

STAIR-LIFT.

SPECIFICATION forming part of Letters Patent No. 672,823, dated April 23, 1901.

Application filed January 7, 1901. Serial No. 42,411. (No model.)

*To all whom it may concern:*

Be it known that I, JAMES M. DODGE, a citizen of the United States, residing in Philadelphia, Pennsylvania, have invented certain Improvements in Stair-Lifts, of which the following is a specification.

My invention relates to certain improvements in stair-lifts or endless-belt conveyers which can be flexed to form treads and risers of a stairway.

The object of my invention is to provide a coupling for the flexed portion of a stair-lift, so that the drive will be through the coupling, thus relieving the flexed portions of the belt and the guideways from severe unnatural strains.

In the accompanying drawings, Figure 1 is a side view in diagram, illustrating my invention. Fig. 2 is a plan view of a stair-lift; and Fig. 3 is a transverse sectional view on the line 3 3, Fig. 1.

A is an endless-belt conveyer, in the present instance made of sections *a* and *b*, hinged together. The belt is flexed on the elevating run so that the sections *a* form the treads and the sections *b* the risers of the stairway. On line with each pivot is a pin or roller which travels in guideways at the sides of the stairway. The pins *c* in line with the pivots at the nose of the tread travel in the guideways C, while the rolls *d* in line with the pivots at the inner portion of the tread travel in guides D. The endless belt passes around a guide-wheel E at the top and around a guide-wheel F at the bottom. The upper guide-wheel E in the present instance is small, and the belt is made of a series of short links, so that each of the sections *a* and *b* is flexible and will readily pass around the small wheel. The endless belt can be driven in any suitable manner either from the wheels E or the wheels F.

It will be seen that in the ordinary form of stairway where the carrying run of the belt is driven by tension or pull upon the belt if this section is flexed, as shown, to form the treads and risers it will take considerable power to drive the belt and, moreover, there is considerable friction, owing to the fact that the tendency of the belt is to straighten out, while the guides hold them in the position illustrated. To overcome this tendency and to relieve the flexed portion of the belt, as well as the guides, from the severe strains, I mount under the flexed portion of the belt an endless belt I, having lugs *i*, which engage the belt at each point where the inner portion of the tread joins the lower portion of the riser.

The belt I passes around guide rolls or wheels I', which are mounted in fixed bearings, so that the belt I is in no sense a driving-belt. It simply travels with the endless belt A, which is driven, and the belt I acts as a coupling, tying together the several flexed sections forming the treads and risers, so that instead of the drive being through these flexed sections it is carried directly through the portion of the belt I which is in engagement with the belt A, so that in practice the belt I is simply a continuation of the conveyer A, and the flexed portions are carried by this belt.

Thus it will be seen that I materially reduce the power necessary to drive a stair-lift or stairway of this type, and I furthermore relieve both the wheels and the guides from the friction necessary in this type of stair-lift.

The belt I in the present instance is in the form of an endless chain having lugs or projections *i*, which engage the main carrying-belt. I have shown in Figs. 2 and 3 two endless chains, one at each side of the stair-lift. There may be as many of these chains as desired, according to the width of the stairway, and the belts may be constructed in any manner without departing from the main feature of my invention.

The device is simple in construction and can be readily applied without interfering with the general form of the structure.

I claim as my invention—

1. The combination in a stair-lift, of an endless carrying-belt, means for driving said belt, means for flexing it to form treads and risers as it is driven, and a coupling engaging the flexed portion of the belt, whereby the driving strain will be taken by the coupling from the flexed portion of the carrying-belt, substantially as described.

2. The combination in a stair-lift, of an endless belt, means for flexing said belt to form treads and risers, and means for driving said belt, with a supplementary endless belt engaging the flexed portion of the main belt and driven by said main belt, substantially as described.

3. The combination in a stair-lift, of an endless belt made up of a series of sections pivoted together forming treads and risers, wheels at each end over which the belt passes, one of said wheels being the driving-wheel, guides for flexing the upper run of the belt to form treads and risers, an auxiliary belt directly under the upper run of the main belt, with lugs on the auxiliary belt engaging the main belt at the pivots connecting the inner edge of the tread with the lower portion of the riser of the flexed portion of the belt, substantially as described.

4. The combination in a stair-lift, of an endless carrying-belt, means for driving said belt, means for flexing it to form treads and risers as it is driven, and a coupling-belt at each side engaging the flexed portion of the carrying-belt, so that the driving strain is taken by the coupling-belts from the flexed portion of the carrying-belt, substantially as described.

In testimony whereof I have signed my name to this specification in the presence of two subscribing witnesses.

JAMES M. DODGE.

Witnesses:
  WILL. A. BARR,
  JOS. H. KLEIN.